Oct. 16, 1934.  A. J. WEATHERHEAD, JR  1,977,564

FITTING

Filed May 16, 1932

Inventor
ALBERT J. WEATHERHEAD, JR.
By
Attorney

Patented Oct. 16, 1934

1,977,564

UNITED STATES PATENT OFFICE 1,977,564

FITTING

Albert J. Weatherhead, Jr., Cleveland, Ohio, assignor to The Weatherhead Company, Cleveland, Ohio, a corporation of Ohio Application May 16, 1932, Serial No. 611,541

3 Claims. (Cl. 285—84)

This invention relates to unions or couplings for fluid conducting devices and is particularly adapted to and is disclosed and described in the embodiment of affording a swiveling connecion between a flexible non-metallic conduit, such as a rubber hose, and a fixed non-rotatable part.

It is among the objects of my invention to provide a coupling or union by virtue of which such a device as a rubber hose may be connected to a fixed connection without rotating the hose with relation to the connection. Another object is to provide such a union or coupling adapted for the vigorous service of connecting such parts which are subjected to and conduct fluid under high pressure. Another object is to provide a union or coupling which efficiently and effectively seals the end of the high pressure rubber hose and also provides a fluid tight leak proof joint having a swiveling part for effecting a connection with a fixed non-rotatable connector. Another object is to provide such a coupling or union as inexpensively as possible.

Other objects will appear from the following description of a preferred form of my invention, reference being had to the accompanying drawing. The essential characteristics are summarized in the claims.

Figure 1:
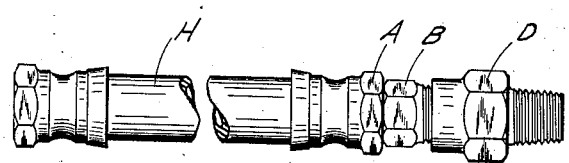
Figure 2:
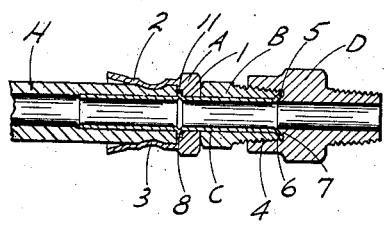
Figure 3:
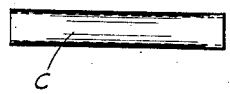
Figure 4:
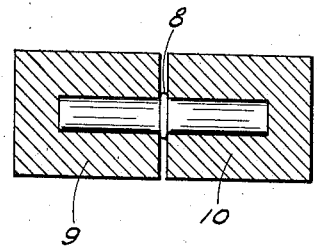

In the drawing, Fig. 1 is an assembly of the hose, coupling and fixed part; Fig. 2 is a longitudinal section of the part shown in Fig. 1; Fig. 3 is a view of the internal connecting tube prior to deformation in assembling the coupling unit; Fig. 4 illustrates a method of upsetting an annular rib on the tube shown in Fig. 3; and Fig. 5 discloses the coupling parts in assembled relation showing a manner of flaring the ends of the tube of Fig. 3 to complete the assembly thereof.

Referring particularly to Figs. 1 and 2, I have illustrated the preferred embodiment of my invention adapted for use, for example, in connecting the rubber hose of a fluid pressure operating system to a non-rotatable part of a motor vehicle. I have illustrated the hose H having at one end the connector and union comprising the external parts A and B and the internal tubular part C all acting together and adapted to make a fluid tight joint with a fixed non-rotatable part D. The part A of the connector comprises essentially a body or head 1 centrally apertured to slide over the inner tube C and having a longitudinally extending cylindrical portion 2 adapted to be deformed as at 3, to grip the hose H and compress it upon that portion of the tube C lying radially within it.

The part B of the connector may preferably be a replica of the male member of the coupling disclosed in my prior Patent No. 1,733,925, being sleeved upon the inner tube C and being rotatable with respect thereto. The fixed part D preferably has an internally threaded portion 4 terminating in a conical seat 5, which in cooperation with the internal conical seat 6 of the member B, are arranged to grasp and form a seal with the flared end 7 of the tube C, all preferably in the manner disclosed in my prior patent.

The tube C may preferably be plain copper tubing, which to carry out the objects of this invention, has a centrally disposed raised annular rib 8 conveniently formed by an upsetting process between two dies such as 9 and 10, shown in Fig. 4. Referring particularly to Fig. 2, it will be seen that there is provided an internal counter-bore or recess 11 in the hose side of the head 1 of the member A. This recess 11 receives the annular rib 8 of the tube C whereby longitudinal movement between the parts is limited.

In assembling the parts of the coupling or union, the hose engaging part A is placed over the tube C by sliding it from right to left as viewed in Fig. 2, it being understood that the right end of the tube has not at that time been flared, as shown in Fig. 2. The part A, as noted above, is held by the annular rib 8 in the longitudinal relation shown in Fig. 2. In this position the tube C is so positioned as to be inserted within the bore of the rubber hose and the part A being then undeformed, as shown in Fig. 5, whereby it is adapted to receive the end of the rubber hose within the cylindrical portion 2 thereof.

Figure 5:
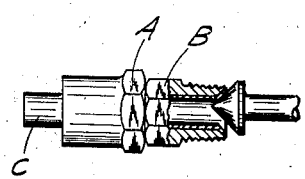

After the parts A and C are assembled, the part B is also slid over the right end of the tube C, as viewed in Fig. 2, to substantially the same position indicated therein, whereupon the extreme right end of the tube C is flared outwardly, see Fig. 5, to conform to the internal conical seats 6 in the end of the part B, thereupon securing the three parts A, B and C in a uniform operative assembly.

The parts having been so assembled, the rubber hose may thereafter be inserted into the cylindrical portion 2 of the part $a$, the left end of the tube $c$ lying within the bore of the hose and supporting it radially while the cylindrical portion 2 is deformed as at 3, and preferably according to the teaching of my prior application Serial No. 581,893, filed December 18, 1931.

The parts A and C being in positive engagement with the end of the hose, form between them a leak proof joint and necessarily remain in non-rotatable relation to the hose. It being very often desirable to connect the hose to a non-rotatable part, it will be seen that I have made possible this connection by permitting the member B to be rotated relative to the tube C for effecting a connection between the hose and any non-rotatable part. Moreover, the connection effected by providing a leak proof joint at the flared end of the tube C makes this assembly very well suited for conducting fluids under high pressure.

While I have illustrated and described a preferred form of my invention and have spoken of a particular use in which I have successfully practiced it, I do not care to be so limited. I am aware that certain modifications and changes will occur to those skilled in the art all within the major precepts of my invention, and I do not care to be limited to the specific form or preferred form of my invention described herein, or in any manner other than by the claims appended hereto, when given the range of equivalents to which the patent issuing herein may be fairly entitled.

I claim:

1. A swivel connector for detachably connecting a non-metallic hose with a female metallic tube coupling member having a convex conical seat for engaging a flared tube end, comprising a longitudinally extending tubular part having a projection in the mid portion thereof, a non-metallic hose sleeved over one end of said part and compressed thereagainst, a thick walled radially extending annular part disposed midway of said tubular part and bearing against the end of said hose and engaging said projection, and having an integrally formed cylindrical portion overlying the end of said hose and extending co-axially of said tubular part and deformed to forcibly engage said hose end to press it axially against said thick walled annular part and also against said tubular part, the other end of said tubular part being flared outwardly to conform to the conical seat of said female member, and a male tube coupling member having a concave conical seat rotatably mounted on said tubular part between the flared end of the tube and the said thick-walled annular part and secured thereon thereby.

2. A swivel connector for detachably connecting a non-metallic hose with a female metallic tube coupling member having a convex conical seat for engaging a flared tube end, comprising a longitudinally extending tube, a non-metallic hose sleeved over one end of said part and compressed thereagainst, a thick walled radially extending annular part disposed midway of said tube and bearing against the end of said hose and having an integrally formed cylindrical portion overlying the end of said hose and extending co-axially of said tubular part and deformed to forcibly engage said hose, the other end of said tube being flared outwardly to conform to the conical seat of said female member, a projection on said tube adjacent the end of said hose and engaging the thick walled annular part, and a male tube coupling member rotatably mounted on said tube between the flared end of the tube and the said thick walled annular part and secured thereon thereby.

3. In combination, a female metallic tube coupling member having a convex conical seat for engaging a flared tube end, and a swivel connector for detachably connecting a non-metallic hose thereto comprising a longitudinally extending tubular part, a non-metallic hose sleeved over one end of said part and compressed thereagainst, a thick walled radially extending annular part disposed midway of said tubular part and bearing against the end of said hose and having a non-circular periphery and an integrally formed cylindrical portion overlying the end of said hose and extending co-axially of said tubular part and deformed to forcibly engage said hose end, the other end of said tubular part being flared outwardly to conform to the conical seat of said female member, and a male tube coupling member having a concave conical seat rotatably mounted on said tubular part between the flared end of the tube and the said thick walled annular part and secured thereon thereby.

ALBERT J. WEATHERHEAD, JR.